G. S. BRONSON.
SPRING HINGE.
APPLICATION FILED MAR. 4, 1914.
1,095,701.
Patented May 5, 1914.
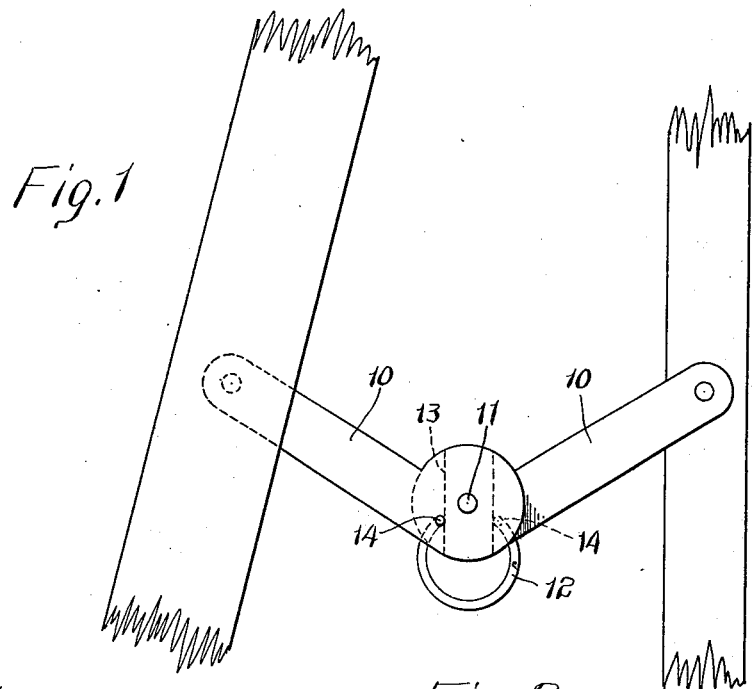
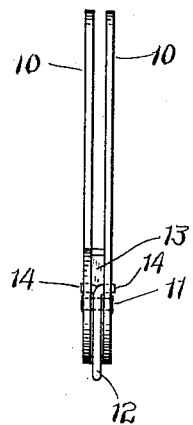
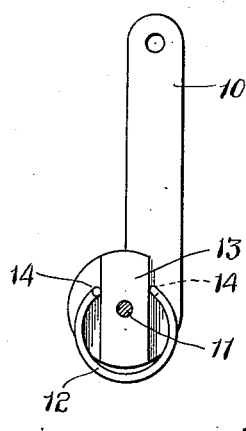
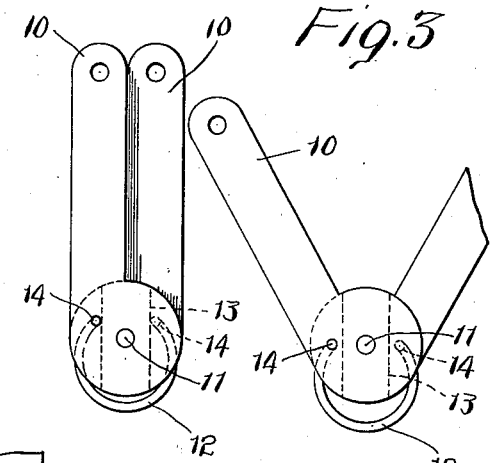
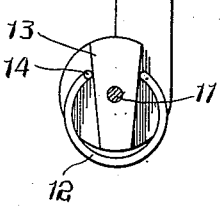
WITNESSES:
H.W. Meade
E. M. Culver
INVENTOR
George S. Bronson
BY
ATTORNEY

UNITED STATES PATENT OFFICE.

GEORGE S. BRONSON, OF BEACON FALLS, CONNECTICUT.

SPRING-HINGE.

1,095,701.  Specification of Letters Patent.  Patented May 5, 1914.

Application filed March 4, 1914. Serial No. 822,276.

*To all whom it may concern:*

Be it known that I, GEORGE S. BRONSON, a citizen of the United States, residing at Beacon Falls, county of New Haven, State of Connecticut, have invented an Improvement in Spring-Hinges, of which the following is a specification.

This invention relates to the class of spring hinges illustrated and described in patent to G. S. and H. D. Bronson, No. 577,593, dated Feb. 23, 1897, and has for its object to reduce the number of parts and to generally simplify, cheapen and improve the construction.

In the accompanying drawing forming a part of this specification, Figure 1 is an elevation illustrating a use of the hinge and showing the leaves in the fully open position; Fig. 2 an elevation of the hinge detached showing the leaves in the fully closed position; Fig. 3 an elevation showing the leaves at an intermediate position; Fig. 4 an elevation as seen from the right in Fig. 2; Fig. 5 a view corresponding with Fig. 2 with the upper leaf removed, and Fig. 6 is a similar view showing a differently shaped stop block.

My novel hinge comprises simply two leaves made alike and indicated by 10, a pivot 11, a bow spring 12 and a stop block 13. The shape of the leaves is unimportant so far as the principle of the invention is concerned and may be varied to suit the requirements of uses to which the hinge is to be placed. The stop block lies between the leaves and the pivot retains the parts in place, with the leaves in parallel relation. The spring is preferably made ring-shaped and the ends 14 thereof are bent outward in opposite directions from the plane of the hinge, as shown in Fig. 4, and have fixed engagement with holes in the leaves. The spring serves the double purpose of moving the leaves to either the open or closed position (when carried past the intermediate position) and of stopping the movement of the leaves at either the fully opened or fully closed position, or both, through engagement of the ends thereof with the opposite sides of the stop block. It will be obvious that the stopping of the leaves in any required position may be effected by variations in the shape of the stop block, a variant form of stop block being shown in Fig. 6.

The operation is a follows: When the leaves are in the intermediate position, as in Fig. 3, the spring will have no action upon the leaves, but when the leaves are moved past this position, in either direction, the spring will act to carry the leaves and the parts carried thereby toward either the open or closed position, as may be. As soon as the leaves reach either the open position as in Fig. 1, or the closed position as in Fig. 2, the ends 14 of the spring will come into engagement with the stop block and rigidly lock the leaves and the parts carried thereby against further movement. The commencement of the opening movement from the position shown in Fig. 1 is made against the power of the spring. The instant, however, that the leaves pass the intermediate position, as in Fig. 3, the spring will act to continue the movement until it is stopped by the engagement of the ends of the spring with the stop block. The special relation to each other of the sides of the stop block are determined by the position or positions at which it is required to stop the leaves.

Having thus described my invention I claim:

1. A hinge comprising leaves pivoted in parallel relation, a stop block between the leaves and a bow spring also lying between the leaves, the ends of said spring having fixed engagement with the respective leaves.

2. A hinge comprising leaves pivoted in parallel relation, a stop block between the leaves, and a bow spring also lying between the leaves, the ends of said spring being bent outward in opposite directions and engaging the respective leaves, and by engagement with the stop block on opposite sides of the pivot limiting the opening and closing movements of the leaves.

In testimony whereof I affix my signature in presence of two witnesses.

GEORGE S. BRONSON.

Witnesses:
 W. B. HOPWOOD,
 GEO. E. BRONSON.

---

Copies of this patent may be obtained for five cents each, by addressing the "Commissioner of Patents, Washington, D. C."